United States Patent
Farah et al.

(10) Patent No.: US 12,521,729 B2
(45) Date of Patent: Jan. 13, 2026

(54) FLOW ASSURANCE IN A FLARE GAS RECOVERY UNIT

(71) Applicant: Saudi Arabian Oil Company, Dhahran (SA)

(72) Inventors: Mohamud M. Farah, Ras Tanura (SA); Abdulaziz Al-Qahtani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 317 days.

(21) Appl. No.: 18/333,338

(22) Filed: Jun. 12, 2023

(65) Prior Publication Data

US 2024/0408614 A1 Dec. 12, 2024

(51) Int. Cl.
*B01D 53/02* (2006.01)
*B03C 1/033* (2006.01)

(52) U.S. Cl.
CPC ........ *B03C 1/0332* (2013.01); *B03C 2201/20* (2013.01)

(58) Field of Classification Search
CPC ...... B03C 1/0332; B03C 1/30; B03C 2201/20
See application file for complete search history.

(56) References Cited

U.S. PATENT DOCUMENTS

| | | | | |
|---|---|---|---|---|
| 5,727,903 | A * | 3/1998 | Borray | B01D 53/229 405/129.95 |
| 7,855,171 | B2 | 12/2010 | Trahan | |
| 8,100,990 | B2 * | 1/2012 | Ellens | C10L 5/447 44/589 |
| 9,334,204 | B1 * | 5/2016 | Radaelli | B01J 8/001 |
| 10,017,701 | B2 * | 7/2018 | Meyer | C10L 3/101 |
| 10,981,104 | B2 | 4/2021 | Al Muhsen | |
| 11,136,491 | B2 | 10/2021 | Chen et al. | |
| 11,235,338 | B2 | 2/2022 | Hassell | |
| 11,326,439 | B2 | 5/2022 | Oduro | |
| 11,339,339 | B1 * | 5/2022 | Nouri | C10L 3/104 |
| 2006/0272503 | A1 * | 12/2006 | Adam | B01D 17/0214 95/253 |

(Continued)

FOREIGN PATENT DOCUMENTS

CN 113982532 1/2022

OTHER PUBLICATIONS

Blackpowdersolutions.com [online], "Magnetic Separator Systems," Available on or before May 8, 2021, via Internet Archive: Wayback Machine URL <https://web.archive.org/web/20210508050117/https://blackpowdersolutions.com/magnetic-separator-systems/>, retrieved on Jan. 25, 2024, URL <https://blackpowdersolutions.com/magnetic-separator-systems/>, 17 pages.

(Continued)

*Primary Examiner* — Christopher P Jones
(74) *Attorney, Agent, or Firm* — Fish & Richardson P.C.

(57) ABSTRACT

A system and a method for flow assurance for a flare gas recovery unit are provided. An exemplary flow assurance system includes a knockout drum having a flare header coupled to an inlet, a high-efficiency separator coupled to an outlet of the knockout drum, a magnetic separator coupled to the outlet of the high-efficiency separator, and a multi-stage compression system coupled to the outlet of the magnetic separator.

21 Claims, 4 Drawing Sheets

(56) References Cited

U.S. PATENT DOCUMENTS

| | | | |
|---|---|---|---|
| 2015/0344788 A1* | 12/2015 | Meyer | C10L 3/101 |
| | | | 62/619 |
| 2016/0045841 A1* | 2/2016 | Kaplan | B03C 1/00 |
| | | | 429/49 |
| 2018/0305274 A1* | 10/2018 | Rafique | B01J 23/462 |
| 2021/0008497 A1 | 1/2021 | Al Muhsen | |
| 2022/0362782 A1 | 11/2022 | Abang et al. | |

OTHER PUBLICATIONS

Energynow.com [online], "Technical Report: Amine Sweetening Units—Can magnetic separation improve reliability and reduce filtration costs?," Dec. 18, 2019, retrieved on Jan. 25, 2024, retrieved from URL <https://energynow.com/2019/12/technical-report-amine-sweetening-units-can-magnetic-separation-improve-reliability-and-reduce-filtration-costs/>, 11 pages.

Wsimg.com [online], "Magnetic Filtration for Iron Sulfide & Iron Oxide Removal," Available on or before Jul. 16, 2020, retrieved on Jan. 25, 2024, retrieved from URL <https://img1.wsimg.com/blobby/go/0337b61a-d8fc-4d81-a558-c88677c1492c/downloads/Amine%20Optimization%20-%20Magnetic%20Filtration.pdf?ver=1618273799964>, 1 page.

* cited by examiner

FLOW ASSURANCE IN A FLARE GAS RECOVERY UNIT

TECHNICAL FIELD

This disclosure relates to methods of separating entrained solids from a flow in a flare gas header.

BACKGROUND

Oil and gas refining and production plants frequently flare gas to dispose of wastes. However, flaring unrecovered residual gas has significant negative environmental implications, for example, leading to increased greenhouse gas emissions (GEG), $SO_x$ emissions, and the release of other deleterious pollutants. Further, recent increases in environmental awareness, a drive to lower emissions, and the economic benefits associated with flare gas recovery has caused a paradigm shift in flaring practice. The recovery of flared gas reduces noise, thermal radiation, operating and maintenance costs, air pollution, and gas emissions. The use of the recovered gas also reduces fuel gas and steam consumption.

SUMMARY

An embodiment described herein provides a flow assurance system for a flare gas recovery unit. The flow assurance system includes a knockout drum having a flare header coupled to an inlet, a high-efficiency separator coupled to an outlet of the knockout drum, a magnetic separator coupled to the outlet of the high-efficiency separator, and a multistage compression system coupled to the outlet of the magnetic separator.

Another embodiment described herein provides a method for providing flow assurance in a flare gas recovery unit. The method includes performing a gravity separation of entrained materials from the flare gas creating a separated gas, filtering entrained materials from the separated gas, creating a filtered gas, removing magnetic particles from the filtered gas, creating a particulate separated gas, and compressing the particulate separated gas, creating a compressed gas.

DETAILED DESCRIPTION

The present disclosure relates to mitigating flow assurance problems of flare gas recovery units (FGRUs) in oil and gas facilities. Unlike pipelines, which are linear and cylindrically shaped, an FGRU process unit has complex geometrical configuration for the piping, as well as a complex multistage compression system. Current approaches to mitigate the flow assurance problems associated with iron sulfide particles in FGRUs focuses on the use of chemical inhibition and dissolution, strainers, filter elements, cyclonic separation units and centrifugal separation units. However, this small particle size of the iron sulfide particles makes the separation in these units inefficient.

The systems and methods provided herein utilize a magnetic filtration unit that is equipped with powerful magnets to attract and trap ferromagnetic particles entrained in the wet flare gas feed. The magnetic filters are installed upstream of the FGRU compression system and are capable of trapping ferromagnetic particles with different sizes and shapes. Accordingly, these units improve flow assurance, compressor reliability, and help to extend the lifespan of FGRU.

Figure 1:
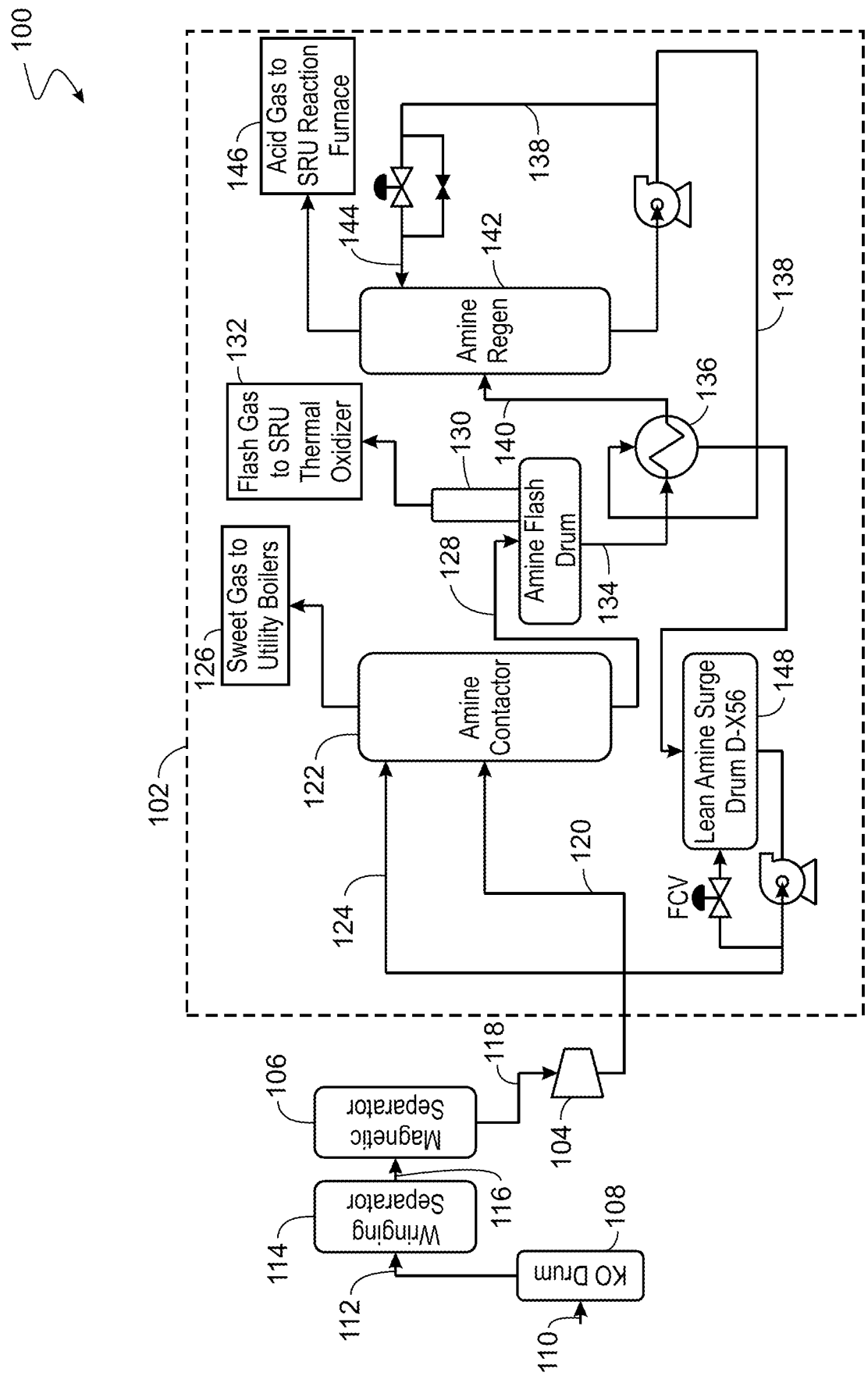
FIG. 1 is a simplified process flow diagram of a flare gas recovery unit (FGRU) including an acid gas recovery unit (AGRU), wherein the compression system for the AGRU is protected by a magnetic filtration system.

FIG. 1 is a simplified process flow diagram of a flare gas recovery unit (FGRU) 100 including an acid gas recovery unit (AGRU) 102, wherein the compression system 104 for the AGRU 102 is protected by a magnetic filtration system 106. New gas plants, as well as other facilities, often integrate an FGRU 100 to decrease flaring. There are a number of technologies that may be used in a FGRU, such as caustic treatment, solid scavenging, liquid scavenging, and membrane technologies, among others. The selection of the specific technology for use in the FGRU 100 is determined by technical and economic factors. However, the most common technology for the FGRU 100 includes a compression system that is used to increase the pressure and an AGRU 102 that is used to remove hydrogen sulfide ($H_2S$) from the gas stream to produce a non-sour or "sweet" gas suitable for use as a fuel gas.

The FGRU 100 has a knockout drum 108 coupled to a flare stream 110 from a flare header. The knockout drum 108 slows the flow of gas from the flare stream 110, allowing larger droplets, and particles to settle. A separated gas stream 112 from the knockout drum 108 is flowed to another separation unit to remove smaller particles.

In the FGRU 100, the separated gas stream 112 is flowed to a high-efficiency separator 114, such as a Wringing® separator available from Jonell Systems of Breckenridge, TX, USA. In a Wringing® separator, very small particles and droplets are separated by a gas flow pattern, for example, that creates a vortex through an angled downward gas flow adjacent to the main flow. Small particles and droplets, such as less than about 5 µm, are trapped in a vortex in the center of the Wringing® separator and dropped into an outlet. Solid particles of 1 µm may be separated at an efficiency of greater than about 99% removal and droplets may be removed at higher efficiencies. The Wringing® separator does not use filters, and, thus, the operational costs are lower than other types of separation units. However, the Wringing® separator will still allow some solid particles, to pass through in the filtered gas 116. The high-efficiency separator 114 is not limited to a Wringing® separator, but may use other types of high-efficiency separators, such as multi-cyclonic separators, filter separators, multistage filter separators, and the like.

Chemical analysis has shown these solid particles to be overwhelmingly iron sulfide (FeS), arising from the reaction of the carbon steel (CS) piping with the wet sour gas from the following reaction:

$$H_2S(g) + Fe(s) \rightarrow FeS(s)$$

Iron sulfide scale is generally protective to CS, as it forms a passive layer that protects the piping from further corrosion. However, the passive layer may be disrupted by contaminants, such as chlorides, or by high flow velocities, among others. The FeS particles released by the disruption are often smaller than one micron, allowing them to pass through the high-efficiency separator 114. As the particles are ferromagnetic, they can be removed by taking advantage of this property.

In embodiments described herein, the filtered gas 116 is provided to the magnetic filtration system 106. In the magnetic filtration system 106, the filtered gas 116 is flowed in close proximity to a magnet, which captures the ferromagnetic particles. The particle separated stream 118 can then be compressed for the AGRU 102, while posing less risk of damage to the compression system 104. The magnetic filtration system 106 is discussed further with respect to FIG. 3.

In the FGRU 100 shown in FIG. 1, the AGRU 102 is an amine gas treating system used to process the compressed gas stream 120. The compressed gas stream 120 is provided to an amine contactor 122, in which a lean amine stream 124 is introduced to absorb H2S, and other acid gases, such as CO2. After removal of the acid gases, the sweetened gas 126 can be used as a fuel, for example, in the utility boilers for the plant.

From the amine contactor 122, a rich amine stream 128 is introduced into an amine flash drum 130. As the rich amine stream 128 flashes, a flash gas boils from the rich amine, and exits the amine flash drum 130 in a flash gas stream 132. The flash gas stream 132 can then be sent to a thermal oxidizer for disposal. A low-pressure rich amine stream 134 passes through a heat exchanger 136 where it is heated by heat exchanger with a hot lean amine stream 138. The heated rich amine stream 140 is then fed to an amine regenerator 142.

The amine regenerator 142 is a column separator that includes a reboiler to further heat the heated rich amine stream 140 separate the acid gases. A portion of the hot lean amine stream 138 is returned to the amine regenerator 142 as a reflux stream 144 to improve the separation. An acid gas stream 146 from the overhead of the amine regenerator 142 can then be sent to a reaction furnace for disposal. A lean amine surge drum 148 is used to stabilize the amine flow to the amine contactor 122 as flow of the compressed gas stream 120 is adjusted, The amine used can include monoethanolamine (MEA), diglycolamine (DGA), methyldiethanolamine (MDEA), and diethanolamine (DEA), among others. The selection of the amine may be made based on stability or efficacy in an absorption of the acid gas. Unlike acid-gas treating units located in other plant units, the compressed gas stream 120 used to feed the AGRU 102 may include a wide array of gases from the plant, and may pose unique process and corrosion challenges. For example, the presence of oxygen in the compressed gas stream 120 and any solids that reach the AGRU 102, such as corrosion products, can be extremely detrimental to the performance of the regenerative amine system due to the rapid degradation of the amines as well as process impacts such as corrosion, foaming and erosion. Thus removing the magnetic particles in the magnetic filtration system 106 will extend the life of the amine and lower the overall cost of operating the AGRU 102.

Figure 2:
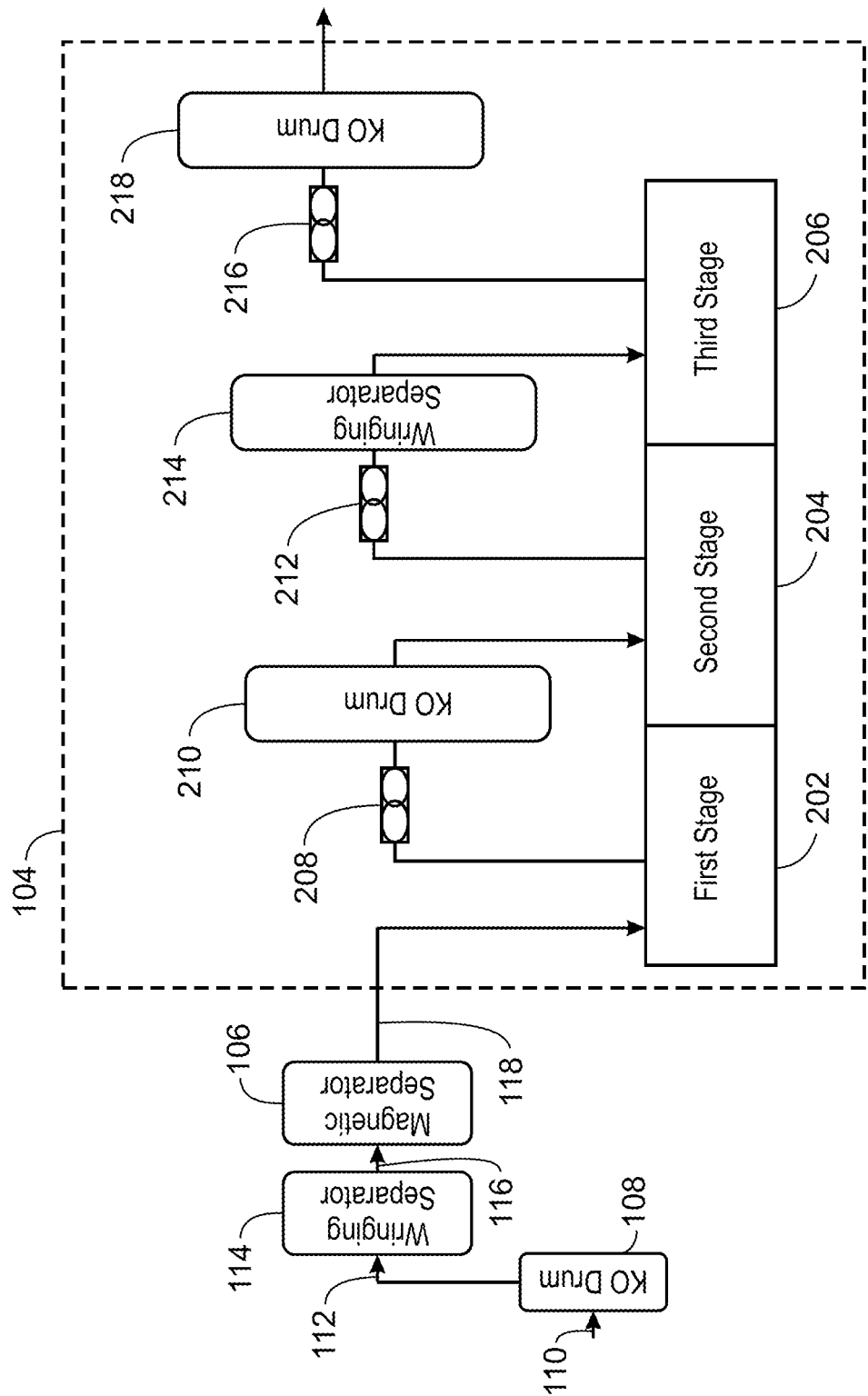
FIG. 2 is a schematic of a compression system that includes three compression stages.

FIG. 2 is a schematic of a compression system 104 that includes three compression stages. Like numbered items are as discussed with respect to FIG. 1. In this example, the compression system 104 includes three compression stages 202, 204, and 206. The compression system 104 is most vulnerable to particles due to the large pressure increment between stages. For example, the pressure increases from 24 psig in the first stage 202 to 88 psig in the second stage 204 and finally to 245 psig in the third stage 206 compression. As a result, the solid deposition and subsequent transfer of these particles into the compressors represents the most deleterious impact, as the compressors integrity and reliability may be impacted.

To lower the possibility of damage to the compression system 104, there is separation units can be placed between the stages. For example, a first intercooler 208 is placed downstream of the first stage 202 to remove heat from the compressed gas. The compressed gas may then be flowed into a first compressor knockout drum 210 to allow any particles and condensed liquid to settle from the compressed gas.

From the first compressor knockout drum 210, the gas is flowed into the second stage 204. The compressed gas from the second stage 204 is passed to a second intercooler 212 to remove the heat from the compressed gas. From the second intercooler 212, the compressed gas can be flowed to a Wringing separator 214, or other high-efficiency separation system, to remove further particulates and condensed liquid droplets.

From the Wringing separator 214, the compressed gas is passed to the third stage 206. The compressed gas from the third stage 206 is passed to third intercooler 216, and then flowed into third compressor knockout drum 218 to remove any final liquid droplets condensed by the third intercooler 216.

As described herein, the separation systems, or others, placed between the three compression stages 202, 204, and 206, of the compression system 104 are not fully effective at removing particulates between the stages. Accordingly, the system still risks damage to the compressor stages, especially in the third stage 206, which has the tightest clearances.

Further, particulates that make it into the downstream systems can cause further reliability and integrity problems. For example, if the AGRU 102 (FIG. 1) is an amine adsorption system, the particles in the amine contactor 122 may cause foaming and other issues in the amine contactor 122. The particles may also increase the degradation of the amine, which can lead to amine corrosion due to the formation of heat stable amine salts (HSAS), especially on susceptible carbon steel piping. The solid particles also increase the risk of erosion on piping and pumps within the AGRU 102.

The placement of a magnetic filtration system 106 to remove magnetic particles upstream of the compression system 104 will help to mitigate these problems. The particle separated stream 118 that is fed to the compression system 104 will lead to more reliable operation of the compression system 104 and more efficient operation of the AGRU 102.

Figure 3:
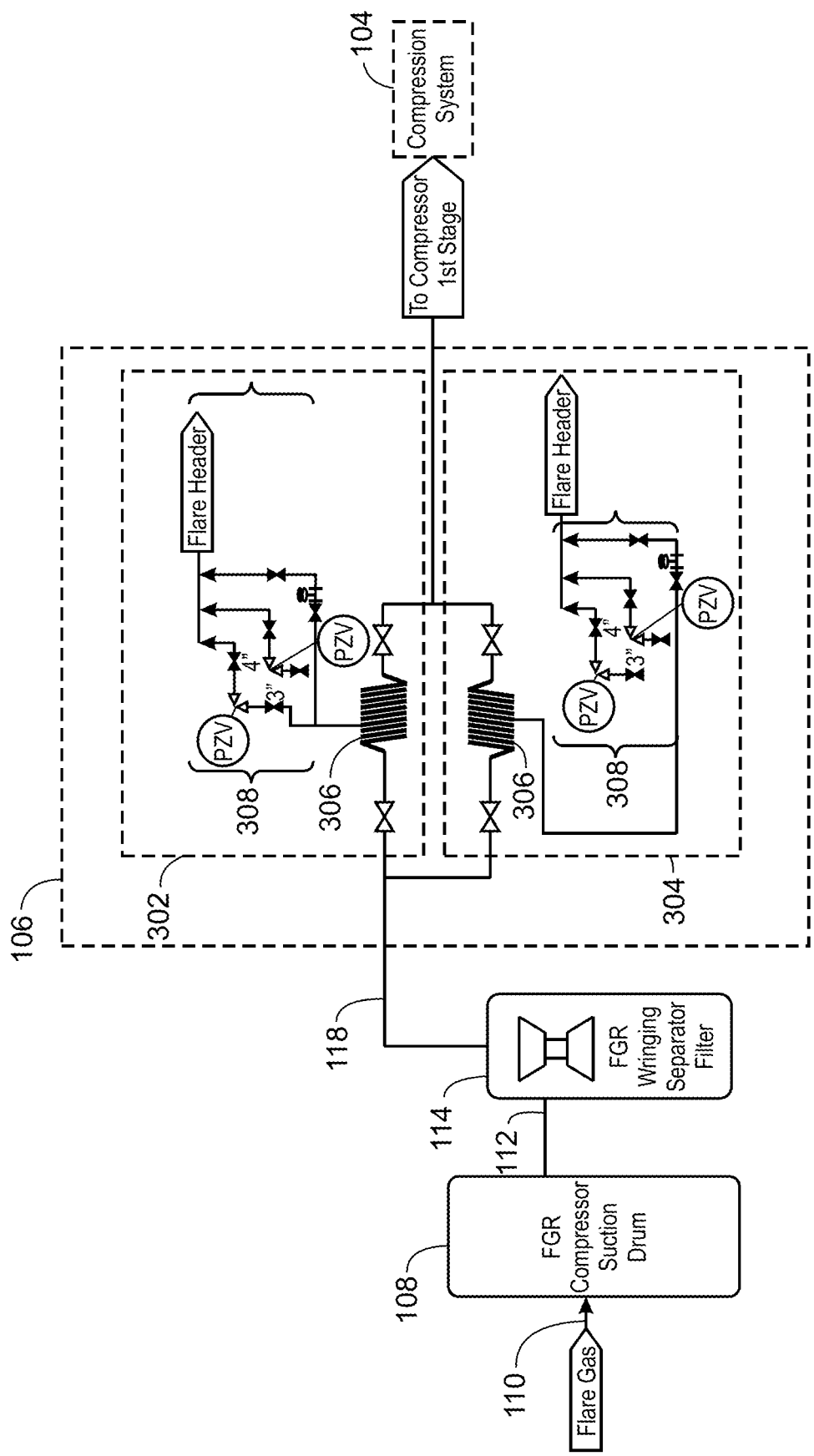
FIG. 3 is a simplified process flow diagram of a magnetic filtration system disposed between high-efficiency separator and a compression system for an FGRU.

FIG. 3 is a simplified process flow diagram of a magnetic filtration system 106 disposed between high-efficiency separator 114 and a compression system 104 for an FGRU. Like numbered items are as described with respect to FIG. 1.

In this embodiment, the magnetic filtration system 106 has two magnetic filtration skids 302 and 304. Each of the magnetic filtration skids 302 and 304 is equipped with a magnetic filter 306 through which the particle separated stream 118 is passed. The use of two magnetic filtration skids 302 and 304 allows for alternating usage, wherein one of the magnetic filtration skids 302 or 304 is online while the other one of the magnetic filtration skids 304 or 302 is off-line for cleaning.

In various embodiments, cleaning is performed by removing the magnets from the container on the magnetic filtration skid 302 or 304 and cleaning it mechanically. The cleaning may also be performed using other techniques, for example, if an electromagnet is used as the element in the magnetic filtration, shutting off the electromagnet may allow the container to be blown clear of the magnetic particles with compressed gas. The cleaning will be conducted after a noticeable increase in the delta pressure across the filter or at specified preventive maintenance schedule, for example, every three months based on the cleaning frequency and the performance of the filtration skid.

In some embodiments, the magnetic filter 306 includes a permanent magnet, such as a neodymium iron boron (NdFeB) magnet, or a samarium cobalt (SmCo) magnet, among others. NdFeB magnets are less expensive and have a higher magnetic field. However, SmCo magnets have an increased resistance to corrosive environments. In other embodiments, the magnetic filter 306 includes an electromagnetic to trap particles while it is energized. In this case, shutting off the electromagnet may allow for easier cleaning.

Each of the magnetic filtration skids 302 and 304 has a pressure relief system 308 on the magnetic filter 306. If the magnetic filter 306 becomes obstructed with particles, the pressure can be released directly to the flare stacks, bypassing the compression system 104 and the AGRU 102. For example, the FGRU unit pressure safety valves (PZVs) will be diverted directly to the flare header that is feeding the flare stacks (not shown). In comparison, flare stream 110, which is being collected from units across the facility, is directed to the FGRU. Further, both KO Drums 108 and 112 have PZVs (not shown) connected to the flare stacks. Thus, any excess flare gases that cannot be accommodated by the FGRU are diverted to the flare stacks.

Figure 4:
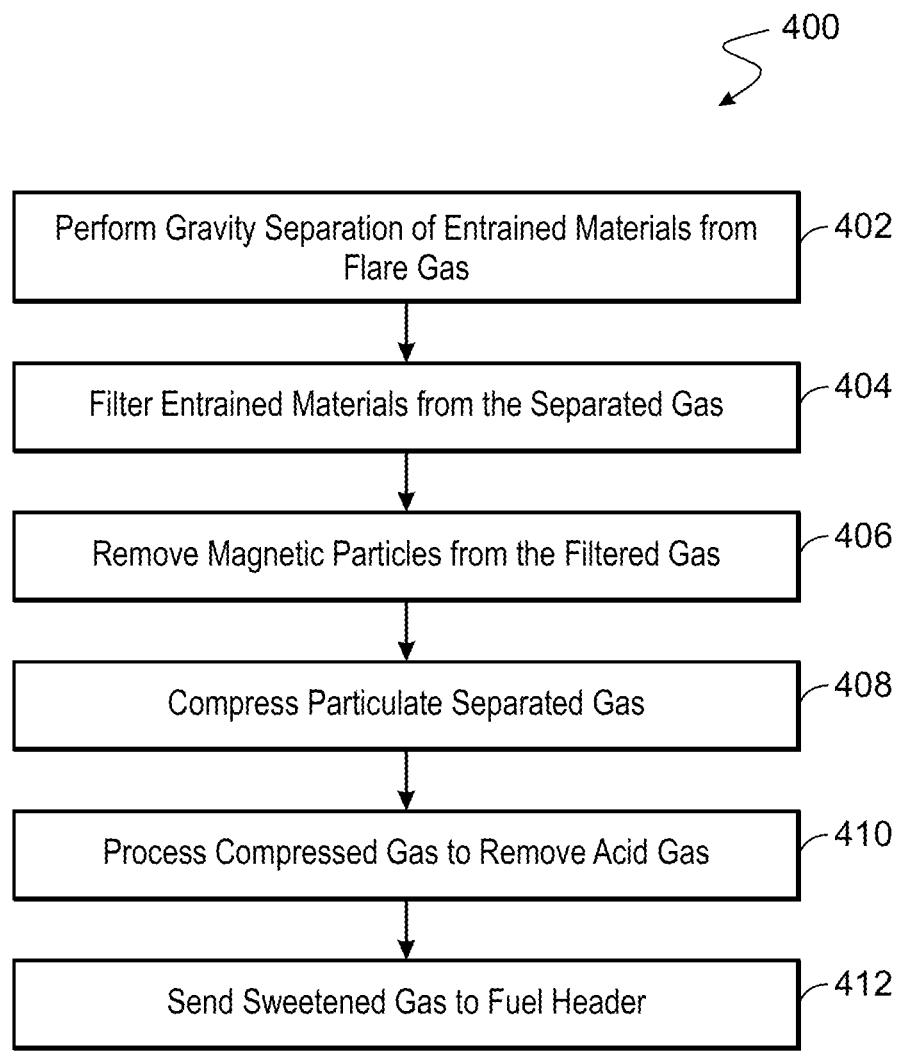
FIG. 4 is a process flow diagram of a method for removing magnetic particles from a flare gas flow prior to processing the flare gas flow in a flare gas recovery unit.

FIG. 4 is a process flow diagram of a method 400 for removing magnetic particles from a flare gas flow prior to processing the flare gas flow in a flare gas recovery unit. The method starts at block 402, with the gravity separation of entrained materials from the flare gas. For example, the flare gas flow is passed into a knockout pot, which slows the flow of the gas and allows entrained particles and liquid droplets to separate.

At block 404, entrained materials, including liquid droplets and particles, are filtered from the separated gas. This may be performed by a high-efficiency separator, such as a Wringing separator, a multi-cyclonic system, or a filter, among others.

At block 406, magnetic particles are removed from the filtered gas. As described herein, this is performed by passing the filtered gas through a magnetic filter that captures the particles on a magnetic core. As described herein, the magnetic core may be a permanent magnet or an electromagnet.

At block 408, the particulate separated gas is compressed for further processing. For example, the particulate separated gas may be compressed in a multistage compressor using intercoolers and further separation systems between each stage, for example, to remove droplets of condenses liquids, and any remaining particles.

At block 410, the compressed gas may be processed to remove acid gases. As described herein, the acid gases may include hydrogen sulfide, carbon dioxide, or mixtures, among others.

At block 412, the sweetened gas is sent to a fuel header to be combusted. Depending on the amount of fuel needed, the sweetened gas may be combined with other fuel gases. The use of the sweetened gas from the flare header lowers the overall power demand for the plant.

Embodiments

An embodiment described herein provides a flow assurance system for a flare gas recovery unit. The flow assurance system includes a knockout drum having a flare header coupled to an inlet, a high-efficiency separator coupled to an outlet of the knockout drum, a magnetic separator coupled to the outlet of the high-efficiency separator, and a multistage compression system coupled to the outlet of the magnetic separator.

In an aspect, combinable with any other aspect, the high-efficiency separator includes a wringing separator.

In an aspect, combinable with any other aspect, the high-efficiency separator includes a multi-cyclonic separator.

In an aspect, combinable with any other aspect, the high-efficiency separator includes a filter separator.

In an aspect, combinable with any other aspect, the magnetic separator includes a permanent magnet.

In an aspect, combinable with any other aspect, the magnetic separator includes an electromagnet.

In an aspect, combinable with any other aspect, the magnetic separator includes a pressure control valve to release pressure to the flare header.

In an aspect, combinable with any other aspect the flow assurance system includes two magnetic separators and valves to place one magnetic separator online while the other magnetic separator is cleaned.

In an aspect, combinable with any other aspect, the multistage compression system includes a first stage, wherein an outlet of the first stage is coupled to a first stage intercooler followed by a first stage knockout drum and a second stage coupled to the outlet of the first stage knockout drum, wherein the outlet of the second stage is coupled to a second stage intercooler followed by a second high-efficiency separation system. The multistage compression system further includes a third stage coupled to the outlet of the second high-efficiency separation system, wherein the outlet of the third stage is coupled to a third stage intercooler followed by a third stage knockout drum.

In an aspect, combinable with any other aspect, the flow assurance system includes an acid gas recovery unit (AGRU) coupled to an outlet of the multistage compression system.

In an aspect, combinable with any other aspect, the AGRU includes a caustic system.

In an aspect, combinable with any other aspect, the AGRU includes an amine system.

In an aspect, combinable with any other aspect, the flow assurance system includes a sweetened gas stream for fuel.

In an aspect, combinable with any other aspect, the flow assurance system includes an acid gas stream provided to a reaction furnace.

Another embodiment described herein provides a method for providing flow assurance in a flare gas recovery unit. The method includes performing a gravity separation of entrained materials from a flare gas creating a separated gas, filtering entrained materials from the separated gas, creating a filtered gas, removing magnetic particles from the filtered gas, creating a particulate separated gas, and compressing the particulate separated gas, creating a compressed gas.

In an aspect, combinable with any other aspect, the method includes processing the compressed gas to remove an acid gas, creating a sweetened gas.

In an aspect, combinable with any other aspect, the method includes providing the sweetened gas to a fuel header.

In an aspect, combinable with any other aspect, the method includes disposing of the acid gas in a reaction furnace.

In an aspect, combinable with any other aspect, removing the magnetic particles includes passing the filtered gas over a permanent magnet.

In an aspect, combinable with any other aspect, removing the magnetic particles includes passing the filtered gas over an electromagnet.

In an aspect, combinable with any other aspect, compressing the particulate separated gas includes compressing the particulate separated gas to form a first pressure gas, cooling the first pressure gas, and separating materials from the first pressure gas after cooling. Further, compressing the particulate separated gas includes compressing the first pressure gas to form a second pressure gas, cooling the second pressure gas, and separating materials from the second pressure gas after cooling. Compressing the particulate separated gas also includes compressing the second pressure gas to form a third pressure gas, cooling the third pressure gas, and separating materials from the third pressure gas after cooling to form a compressed gas.

Other implementations are also within the scope of the following claims.

What is claimed is:

1. A flow assurance system for a flare gas recovery unit, comprising:
    a knockout drum having a flare header coupled to an inlet;
    a high-efficiency separator coupled to an outlet of the knockout drum;
    a magnetic separator coupled to an outlet of the high-efficiency separator; and
    a multistage compression system coupled to an outlet of the magnetic separator.

2. The flow assurance system of claim 1, wherein the high-efficiency separator comprises a wringing separator.

3. The flow assurance system of claim 1, wherein the high-efficiency separator comprises a multi-cyclonic separator.

4. The flow assurance system of claim 1, wherein the high-efficiency separator comprises a filter separator.

5. The flow assurance system of claim 1, wherein the magnetic separator comprises a permanent magnet.

6. The flow assurance system of claim 1, wherein the magnetic separator comprises an electromagnet.

7. The flow assurance system of claim 1, wherein the magnetic separator comprises a pressure control valve to release pressure to the flare header.

8. The flow assurance system of claim 1, wherein the magnetic separator is a first of two magnetic separators, wherein the flow assurance system comprises valves to place the first of the two magnetic separators online while the other of the two magnetic separators is cleaned.

9. The flow assurance system of claim 1, wherein the knockout drum is a first stage knockout drum, wherein the multistage compression system comprises:
    a first stage, wherein an outlet of the first stage is coupled to a first stage intercooler followed by the first stage knockout drum;
    a second stage coupled to the outlet of the first stage knockout drum, wherein the outlet of the second stage is coupled to a second stage intercooler followed by a second high-efficiency separation system; and
    a third stage coupled to the outlet of the second high-efficiency separation system, wherein the outlet of the third stage is coupled to a third stage intercooler followed by a third stage knockout drum.

10. The flow assurance system of claim 1, comprising an acid gas recovery unit (AGRU) coupled to an outlet of the multistage compression system.

11. The flow assurance system of claim 10, wherein the AGRU comprises a caustic system.

12. The flow assurance system of claim 10, wherein the AGRU comprises an amine system.

13. The flow assurance system of claim 12, comprising a sweetened gas stream for fuel.

14. The flow assurance system of claim 12, comprising an acid gas stream configured to be provided to a reaction furnace.

15. A method for providing flow assurance in a flare gas recovery unit, comprising:
    performing a gravity separation of entrained materials from a flare gas creating a separated gas;
    filtering entrained materials from the separated gas, creating a filtered gas;
    removing magnetic particles from the filtered gas, creating a particulate separated gas; and
    compressing the particulate separated gas, creating a compressed gas.

16. The method of claim 15, comprising processing the compressed gas to remove an acid gas, creating a sweetened gas.

17. The method of claim 16, comprising providing the sweetened gas to a fuel header.

18. The method of claim 16, comprising disposing of the acid gas in a reaction furnace.

19. The method of claim 15, wherein removing the magnetic particles comprises passing the filtered gas over a permanent magnet.

20. The method of claim 15, wherein removing the magnetic particles comprises passing the filtered gas over an electromagnet.

21. The method of claim 15, wherein compressing the particulate separated gas comprises:
    compressing the particulate separated gas to form a first pressure gas;
    cooling the first pressure gas;
    separating materials from the first pressure gas after cooling;
    compressing the first pressure gas to form a second pressure gas;
    cooling the second pressure gas;
    separating materials from the second pressure gas after cooling;
    compressing the second pressure gas to form a third pressure gas;
    cooling the third pressure gas; and
    separating materials from the third pressure gas after cooling to form a compressed gas.

* * * * *